(12) United States Patent
Argoitia et al.

(10) Patent No.: US 12,285,779 B2
(45) Date of Patent: Apr. 29, 2025

(54) MULTILAYER ARTICLES CONTAINING ORGANIC LAYERS

(71) Applicant: VIAVI SOLUTIONS INC., San Jose, CA (US)

(72) Inventors: Alberto Argoitia, Santa Rosa, CA (US); Kangning Liang, Santa Rosa, CA (US); Johannes P. Seydel, Petaluma, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 744 days.

(21) Appl. No.: 16/735,329

(22) Filed: Jan. 6, 2020

(65) Prior Publication Data

US 2020/0215571 A1 Jul. 9, 2020

Related U.S. Application Data

(60) Provisional application No. 62/789,387, filed on Jan. 7, 2019.

(51) Int. Cl.
| | |
|---|---|
| *B05D 5/06* | (2006.01) |
| *B05D 7/00* | (2006.01) |
| *C09C 1/00* | (2006.01) |
| *G02B 1/12* | (2006.01) |
| *G02B 5/28* | (2006.01) |

(52) U.S. Cl.
CPC ............ *B05D 5/063* (2013.01); *B05D 7/54* (2013.01); *C09C 1/0015* (2013.01); *G02B 1/12* (2013.01); *C09C 2210/40* (2013.01); *G02B 5/287* (2013.01)

(58) Field of Classification Search
CPC ...... B05D 5/00; B05D 5/0063; C09C 1/0015; C09C 2210/40; G02B 5/287
See application file for complete search history.

(56) References Cited

U.S. PATENT DOCUMENTS

| | | | |
|---|---|---|---|
| 4,363,844 A * | 12/1982 | Lewis | G11B 9/061 369/288 |
| 6,790,387 B1 | 9/2004 | Ball et al. | |
| 6,902,807 B1 | 6/2005 | Argoitia et al. | |
| 7,630,109 B2 * | 12/2009 | Phillips | G03H 1/0236 359/2 |
| 7,821,691 B2 | 10/2010 | Walter et al. | |

(Continued)

FOREIGN PATENT DOCUMENTS

| | | |
|---|---|---|
| CN | 1619417 | 5/2005 |
| CN | 1625468 A | 6/2005 |

(Continued)

OTHER PUBLICATIONS

Shenglong Chang, "Course Preparation and Teaching for Physics Teachers", p. 86, People's Education Press, Dec. 31, 2015 with machine English translation.

(Continued)

*Primary Examiner* — Pegah Parvini
(74) *Attorney, Agent, or Firm* — Mannava & Kang, P.C.

(57) ABSTRACT

An article includes a first organic layer and a second organic layer each with an interior embossed surface; and an embossed reflector layer adjacent to the interior embossed surface of the first organic layer and adjacent to the interior embossed surface of the second organic layer. A method of making an article is also disclosed.

16 Claims, 6 Drawing Sheets

(56) References Cited

U.S. PATENT DOCUMENTS

| | | |
|---|---|---|
| 10,928,579 B2 | 2/2021 | Seydel et al. |
| 11,214,689 B2 | 1/2022 | Seydel et al. |
| 12,050,390 B2 | 7/2024 | Kozlowski et al. |
| 2003/0161997 A1 | 8/2003 | Moran |
| 2003/0190473 A1 | 10/2003 | Argoitia et al. |
| 2003/0224164 A1 | 12/2003 | Argoitia et al. |
| 2004/0151827 A1 | 8/2004 | Argoitia et al. |
| 2006/0263539 A1 | 11/2006 | Argoitia |
| 2008/0024866 A1 | 1/2008 | Walter et al. |
| 2010/0298469 A1 | 11/2010 | Kaupp et al. |
| 2016/0075165 A1 | 3/2016 | Machizaud et al. |
| 2016/0168177 A1 | 6/2016 | Cunningham et al. |
| 2017/0320295 A1* | 11/2017 | Fukuda ............ B32B 37/14 |
| 2017/0368798 A1 | 12/2017 | Seydel et al. |
| 2017/0368866 A1 | 12/2017 | Seydel et al. |
| 2017/0369709 A1 | 12/2017 | Seydel et al. |
| 2017/0371091 A1 | 12/2017 | Seydel et al. |
| 2018/0171151 A1 | 6/2018 | Argoitia et al. |
| 2020/0142128 A1 | 5/2020 | Baer et al. |
| 2020/0215571 A1 | 7/2020 | Argoitia et al. |
| 2020/0338922 A1 | 10/2020 | Raksha et al. |
| 2021/0141144 A1 | 5/2021 | Seydel et al. |
| 2022/0003905 A1 | 1/2022 | Kuna et al. |
| 2022/0089878 A1 | 3/2022 | Seydel et al. |
| 2022/0091313 A1 | 3/2022 | Argoitia et al. |

FOREIGN PATENT DOCUMENTS

| | | |
|---|---|---|
| CN | 101035412 | 9/2007 |
| CN | 101636276 A | 1/2010 |
| CN | 103102728 A | 5/2013 |
| CN | 103149615 A | 6/2013 |
| CN | 107710035 A | 2/2018 |
| EP | 1353197 A2 | 10/2003 |
| EP | 2881767 A1 | 6/2015 |
| EP | 3269779 A1 | 1/2018 |
| EP | 3236299 B1 | 7/2024 |
| GB | 2339785 A | 2/2000 |
| JP | H03-129382 A | 6/1991 |
| JP | 2005-538233 A | 12/2005 |
| JP | 2006-251784 A | 9/2006 |
| JP | 2011-128512 A | 6/2011 |
| JP | 2011525442 A | 9/2011 |
| JP | 2012512958 A | 6/2012 |
| JP | 2013-079454 A | 5/2013 |
| JP | 2014509958 A | 4/2014 |
| JP | 2014-159128 A | 9/2014 |
| JP | 2014527472 A | 10/2014 |
| JP | 2015052787 A | 3/2015 |
| JP | 2015527216 A | 9/2015 |
| WO | 2007137438 A1 | 12/2007 |
| WO | 2018045233 A1 | 3/2018 |
| WO | 2020146256 | 7/2020 |

OTHER PUBLICATIONS

Korean Intellectual Property Office, "English translation of the Notice to Submit Response for Korean Application No. KR-10-2023-7043777", dated Dec. 10, 2024, 12 pages.

Japan Patent Office, "Decision to Refuse for JP Application No. 2023-097581", dated Mar. 4, 2025, including English translation 7 pages.

* cited by examiner

MULTILAYER ARTICLES CONTAINING ORGANIC LAYERS

RELATED APPLICATIONS

The present disclosure claims priority to U.S. Provisional Patent Application No. 62/789,387, filed on Jan. 7, 2019, the entire disclosure of which is hereby incorporated by reference.

FIELD OF THE INVENTION

The present disclosure generally relates to articles, such as optical devices in the form of foil, sheets, and/or flakes. The article can include a first organic layer and a second organic layer, wherein the first organic layer and the second organic layer each independently include an interior embossed surface; and an embossed reflector layer adjacent to the interior embossed surface of the first organic layer and adjacent to the interior embossed surface of the second organic layer. Methods of making the article, such as an optical device, e.g., a diffractive pigment, are also disclosed.

BACKGROUND OF THE INVENTION

Many products can be made on a substrate with a release layer, such as sodium chloride. The release layer is evaporated under vacuum prior to coating. Additionally, a multilayer design to make flakes is deposited under vacuum on microstructured substrate foils. Once coated, the multilayer design is stripped off in a wet process that dissolves the release layer using a mixture of acetone and water. The stripped flakes are dried, then milled by grinding to obtain a final desired particle size distribution. Non-limiting examples of dry or wet grinding techniques include jet mill, cryogenic, ultrasonic on liquid media, Rotor-Stator mill wet grinding, etc. The described processes require a large number of steps to be performed by different equipment resulting in increased manufacturing costs and making the end product, a pigment, expensive.

What is needed is an article that can be prepared in a process utilizing fewer pieces of equipment resulting in lower manufacturing costs.

SUMMARY OF THE INVENTION

In an aspect, there is disclosed an article including a first organic layer and a second organic layer, wherein the first organic layer and the second organic layer each include an interior embossed surface; and an embossed reflector layer adjacent to the interior embossed surface of the first organic layer and adjacent to the interior embossed surface of the second organic layer.

In a further aspect, there is disclosed a method of making a diffractive pigment, including coating a first colored, organic layer onto a substrate; depositing a reflector layer onto the first colored, organic layer; and embossing both of the reflector layer and the first colored, organic layer.

In a further aspect, there is disclosed a method of making a diffractive pigment, including coating a first colored, organic layer onto a substrate; embossing the coated first colored, organic layer; and depositing a reflector layer onto the embossed first colored, organic layer, wherein the reflector layer conforms to an embossed surface of the embossed first colored, organic layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings.

Figure 1:
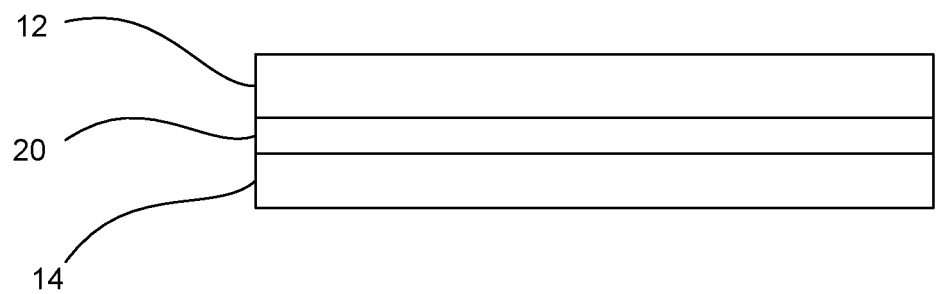
FIG. 1 is a cross-section of an article including a first organic layer, a reflector layer, and a second organic layer, according to an aspect of the present disclosure.
Figure 2:
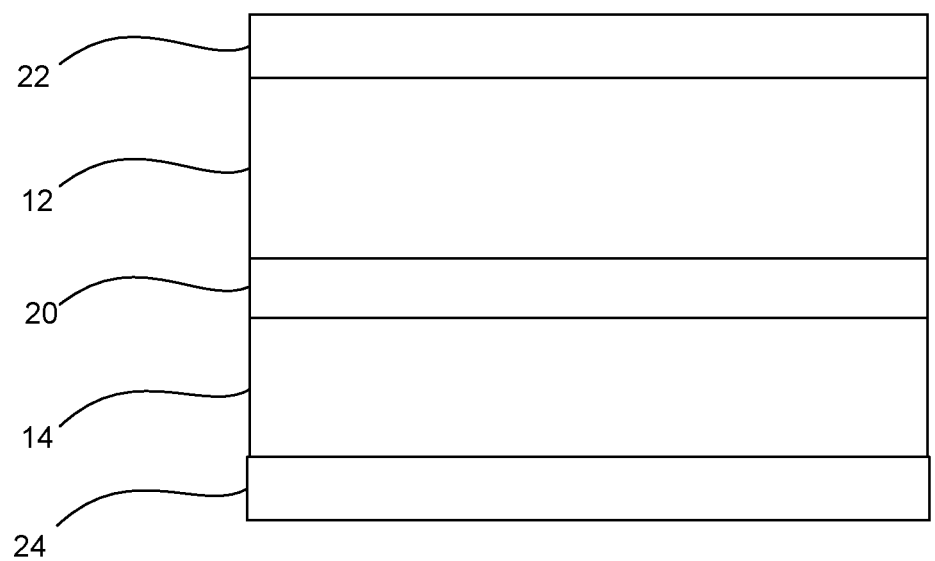
FIG. 2 is a cross-section of an article including a first absorber layer, a first organic layer, a reflector layer, a second organic layer, and a second absorber layer, according to another aspect of the present disclosure.
Figure 3:
FIG. 3 is a cross-section of an article including alternating layers of a first organic layer and a second organic layer, according to another aspect of the present disclosure.
Figure 6:
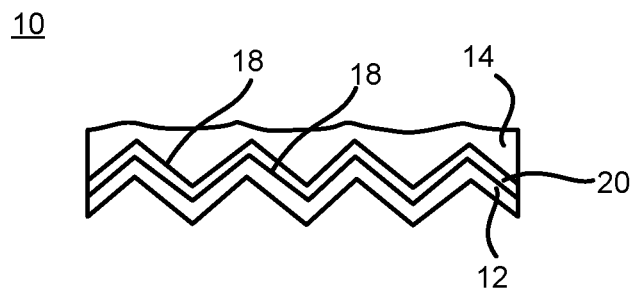
FIG. 6 illustrates a cross-section of an article in which every surface of every layer is embossed.
Figure 7:
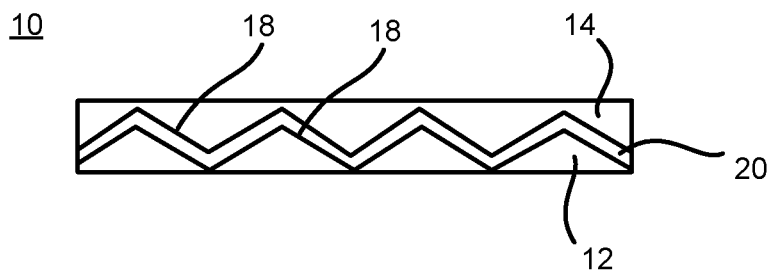
FIG. 7 illustrates a cross-section of an article in which exterior surfaces of exterior layers are planar and every interior surface of every layer is embossed.
Figure 8:
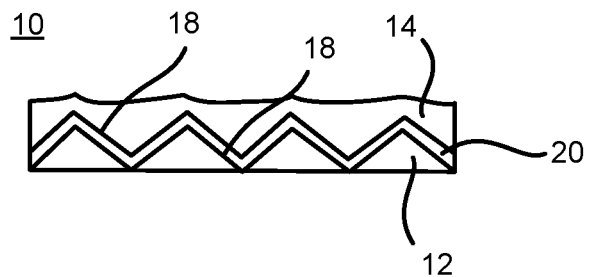
FIG. 8 illustrates a cross-section of an article in which one exterior surface of one exterior layer is planar, another exterior surface of another exterior layer is embossed, and every interior surface of every layer is embossed.

In its broad and varied embodiments, disclosed herein are articles, such as optical devices, for example, in the form of foils, sheets, and flakes; and a method of manufacturing the article 10. The article 10 can include multiple layers such as a three-layer structure as shown in FIG. 1, a five-layer structure, as shown in FIG. 2, and an alternative 5-layer structure as shown in FIG. 3. The layers present in the article 10 include but are not limited to, an organic layer 12, 14, a reflector layer 20, magnetic layer, an absorber layer 22, 24, and etc. The individual layers of the article 10 are more fully disclosed below. In an aspect, all layers of the article 10 can be embossed or otherwise microstructured, for example, as shown in FIGS. 6-8. In another aspect, one or more of the layers of the article 10 can be embossed. In a further aspect, one or more surfaces of one or more layers of the article 10 can be embossed, for example as shown in FIGS. 6-8. In yet another aspect, one or more surfaces of one or more layers of the article 10 can be planar, e.g., self-leveled, for example, as shown in FIGS. 7-8.

The article 10 can be symmetric, i.e., a core layer with the same type and same number of layers on both sides of the core layer. The materials that form the layers in a symmetric article 10 can be different. For example, the article 10 can include a first organic layer 12, a reflector layer 20, and a second organic layer 14, wherein the material that forms the first organic layer 12 is the same or different from the material that forms the second organic layer 14. In another aspect, the article 10 can be asymmetric, i.e., a core layer with different types and different number of layers on both sides of the core layer. The materials that form the layers in an asymmetric article 10 can be different. For example, the article 10 can include a reflector layer 20, an organic layer 12, and an absorber layer 22.

FIGS. 1-3 illustrate various multilayer structures as article 10 and do not exhibit embossing in order to simplify the illustrations. FIGS. 6-8 illustrate various embossed articles 10, but do not exhibit various multilayer articles 10 also to simplify the illustrations. It is intended that any article 10 in FIGS. 1-3 can be embossed in any manner illustrated in FIGS. 6-8. It is also intended that a description of a particular layer, such as a reflector layer 20, is applicable to any article 10 including that particular layer, such as a reflector layer. Additionally, it is intended that reference to a layer, is equally applicable to a first layer and a second layer, for example "organic layer," "first organic layer 12," and "second organic layer 14," unless specified otherwise.

FIG. 1 illustrates a cross-section of an article 10 including a first organic layer 12, a reflector layer 20, and a second organic layer 14. The first organic layer 12 and the second organic layer 14 can each include an interior embossed surface 18; and an embossed reflector layer 20 adjacent to the interior embossed surface 18 of the first organic layer 12 and adjacent to the interior embossed surface 18 of the second organic layer 14. See, e.g., FIGS. 6-8.

The first organic layer 12 and the second organic layer 14 can be the same or different. For example, the first organic layer 12 and the second organic layer 14 can be the same color or can be different colors. In an aspect, the first organic layer 12 and the second organic layer 14 can each be clear. The first organic layer 12 and the second organic layer 14 can include the same or different organic materials.

Although not shown in FIG. 1, any surface of any of the layers present in the article 10 can be embossed or planar. For example, the first organic layer 12 and the second organic layer 14 can each include an interior embossed surface 18, such as the surface adjacent to the reflector layer 20, as shown in FIGS. 6-8. The reflector layer 20 of FIG. 1 can be fully embossed e.g., so that each surface is adjacent to the interior embossed surface 18 of the first organic layer 12 and the interior embossed surface of the second organic layer 14.

In another aspect, the reflector layer 20 can be partially embossed, for example, one surface that is embossed, such as the surface adjacent to the first organic layer 12 and another surface is planar, such as the surface adjacent to the second organic layer 14. Additionally, a partially embossed reflector layer 20 could include a portion, along a length, of both surfaces adjacent to the first organic layer 12 and the second organic layer 14 that is embossed, and another portion, along the remainder of the length, of both surfaces adjacent to the first organic layer 12 and the second organic layer 14 that is planar.

Although not shown in FIG. 1, an article 10 can include, the first organic layer 12 having an exterior planar surface and an interior embossed surface; the second organic layer 14 can include an exterior planar surface and an interior embossed surface; and the reflector layer 20 can include two oppositely oriented embossed surfaces, as shown in FIG. 7. In another aspect, the article 10 can include a first organic layer 12, a reflector layer 20, and a second organic layer 14 each with two oppositely oriented embossed surfaces, as shown in FIG. 6. In yet another aspect, the article 10 can include a first organic layer 12 having an exterior planar surface and an interior embossed surface 18, a fully embossed reflector layer 20, i.e., two oppositely oriented embossed surfaces, and a second organic layer 14 fully embossed, as shown in FIG. 6.

It should be noted that the degree of embossing can vary throughout an article 10. It is possible that the depth of the grooves (modulation) of the embossing is not the same between opposite surfaces of the article 10. The modulation affects the intensity of a particular diffractive wavelength but not the spatial position of the diffracted light. Therefore, a slight modulation on one side can be compensated by a deeper modulation on the other side of the article, as shown in FIG. 6.

Referring back to FIG. 1, in an aspect, the organic layer 12, 14 can be a composite of an organic material and a colorant, such as organic pigments, inorganic pigments, and dyes.

Non-limiting examples of organic colored material includes perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, am inoanthraquinone, isoindoline, diketopyrrolopyrrole, thioindigo, thiazineindigo, isoindoline, isoindolinone, pyranthrone, isoviolanthrone, miyoshi methane, triarylmethane, or mixtures thereof.

The organic material can include materials with thermoplastic properties, for example, materials with softening temperatures lower than a heat distortion of a heat resistant substrate 26. Non-limiting examples of the organic material include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of materials with thermoplastic properties include acrylic polymers, polyvinyl chloride, polystyrene, acrylic/nitrocellulose blends, acrylic/epoxy hybrids, styrene/acrylic, polyvinyl acetate, and polyvinyl alcohol. The thermal softening characteristics are defined in terms of the glass transition temperature (Tg).

In an aspect, the organic layer 12, 14 includes a material with a Tg value in the range of about 20° C. to about 150° C. In the case that the Tg is too low, the organic layer 12, 14 can become too "tacky" and difficult to remove from the embossing master without compromising the embossed microstructure. If the Tg is too high, the temperature required to soften the lay can also compromise the properties of the organic layer 12, 14.

In another aspect, the organic layer 12 can include a composite of the organic material disclosed herein, and light emitter nanoparticles. The light emitter nanoparticles can emit light when bombarded by an external source of radiation, such as an electromagnet or electrons. Non-limiting examples of light emitter nanoparticles include fluorescent nanoparticles and double converter nanoparticles.

FIG. 2 illustrates an article 10 including a first absorber layer 22, a first organic layer 12, a reflector layer 20, a second organic layer 14, and a second absorber layer 24. The article 10 and the layers present in the article 10 of FIG. 2 can be fully or partially embossed as discussed above with regard to FIG. 1, and as illustrated in FIGS. 6-8. Additionally, the first and second absorber layers 22, 24, can each independently include an embossed interior surface, an exterior planar surface, and/or two oppositely oriented embossed surfaces.

In an aspect, the organic layer 12, 14 can include organic, colored, dielectric material. The organic, colored, dielectric material can influence the thin film interference response of the design by selectively absorbing wavelengths of the incident and reflected light. The dielectric material can also be clear. Organic, dielectric material can have low index of refraction that can create an interference that can shift as a function of the incident light and viewing angle. A colorant can be used to color the dielectric material.

Dielectric materials can have various indices of refraction, such as low-index (less than about 1.6), medium-index (between about 1.6 and 2.0), and high-index (greater than about 2.0). Non-limiting examples of dielectric materials include $SiO_2$, $TiO_2$, $Al_2O_3$, $ZrO_2$, $WO_3$, $VO_5$, ITO, $Ta_2O_5$, $CeO_2$, $Y_2O_3$, ZnS, ZnO, $In_2O_3$, $La_2O_3$, MgO, $Nd_2O_3$, $Pr_6O_{11}$, $Fe_2O_3$, $Fe_3O_4$, SiO, $SnO_2$, FeOx, $MgF_2$, $AlF_3$, $CeF_3$, $LaF_3$, LiF, $CaF_2$, cermets, diamond-like carbon, and combinations thereof.

In another aspect, the organic layer 12, 14 can include a composite of organic index influencing nanoparticles and inorganic index influencing nanoparticles. For example, the inorganic index influencing nanoparticles can include $TiO_2$ or ZnS, which create an optical interference that will not change much as a function of the incident and viewing angles.

FIG. 3 illustrates an article 10 including alternating layers of a first organic layer 12 and a second organic layer 14. The article 10 does not include a reflector layer 20. The article 10 and the layers present in the article 10 of FIG. 3 can be fully or partially embossed as discussed above with regard to FIG. 1, and as illustrated in FIGS. 6-8. In this aspect, the first organic layer 12 can include a composite of high index organic material and inorganic dielectric nanoparticles; and the second organic layer 14 includes a composite of low index organic dielectric material.

FIG. 3 can further include a first absorber layer 22 and a second absorber layer 24, as the exterior layers of the article 10. The first absorber layer 22 and the second absorber layer 24 can intensify the color of the first and second organic layers 12, 14.

The reflector layer 20 for use in the article 10 disclosed herein can include metals and/or metal alloys. In one example, any materials that have reflective characteristics can be used. Non-limiting examples of material with reflecting properties include aluminum, silver, copper, gold, platinum, tin, titanium, palladium, nickel, cobalt, rhodium, niobium, chromium, and compounds, combinations or alloys thereof. Examples of other suitable reflective alloys and compounds include bronze, brass, titanium nitride, and the like, as well as alloys of the metals listed above such as silver-palladium. The reflector layer 20 can have an inherent color such as copper, gold, silver copper alloys, brass, bronze, titanium nitride, and compounds, combinations or alloys thereof.

The reflector layer 20 can be produced by the incorporation of particles with reflecting properties into an organic matrix. A silver reflector layer 20 can be deposited using a variant of the Brashear silver process The absorber layer 22, 24 can include any absorber material, including both selective absorbing materials and nonselective absorbing materials. For example, the absorber layer 22, 23 can be formed of nonselective absorbing metallic materials deposited to a thickness at which the absorber layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, carbon, graphite, silicon, geranium, cermet and various combinations, mixtures, compounds, or alloys of the above absorber materials that may be used to form the absorber layer 22, 24.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer 22, 24 include titanium-based compounds such as titanium silicide ($TiSi_2$), titanium boride ($TiB_2$), and combinations thereof. Alternatively, the absorber layer 22, 24 can be composed of a titanium-based alloy disposed in a matrix of Ti, or can be composed of Ti disposed in a matrix of a titanium-based alloy.

In an aspect, the organic layer 12, 14 can be a selective light modulator layer (SLML). The SLML is a physical layer comprising a plurality of optical functions aiming at modulating (absorbing and or emitting) light intensity in different, selected regions of spectrum of electromagnetic radiation with wavelengths ranging from about 0.2 µm to about 20 µm. The SLML can selectively modulate light by means of absorption provided by a selective light modulator system (SLMS) (discussed in more detail below).

The SLML (including each SLML present in an article, if multiple layers are present) can each independently comprise a host material alone, or a host material combined with a selective light modulator system (SLMS). The SLMS can include a selective light modulator molecule (SLMM), a selective light modulator particle (SLMP), an additive, or combinations thereof.

The host material of the SLML can independently be a film forming material applied as a coating liquid and serving optical and structural purposes. The host material can be used as a host (matrix) for introducing, if necessary, a guest system, such as the selective light modulator system (SLMS), for providing additional light modulator properties to the article.

The host material can be a dielectric material. Additionally, or alternatively, the host material can be at least one of an organic material (as disclosed above), an inorganic polymer, and a composite material, such as those composite materials discussed above with regard to the organic layer 12, 14. Non-limiting examples of inorganic polymers includes silanes, siloxanes, titanates, zirconates, aluminates, silicates, phosphazanes, polyborazylenes, and polythiazyls.

The SLMS, for use in the SLML with the host material, can each independently comprise selective light modulator particles (SLMP), selective light modulator molecules (SLMM), additives, or a combination thereof. The SLMS can also comprise other materials.

The SLML can each independently include in an SLMS a SLMP. The SLMP can be any particle combined with the host material to selectively control light modulation, including, but not limited to color shifting particles, colorants include colorant includes one or more of dyes (such as a phthalocyanine-based compound), inorganic pigments, organic pigments, reflective pigments, color shifting pigments, quantum dots, selective reflectors, nanoparticles (selectively reflecting and/or absorbing), and micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$-SnO, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Figure 4A:
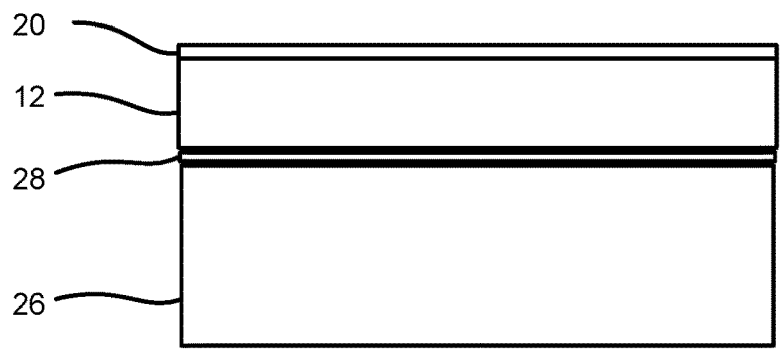
FIGS. 4A-4D illustrate various steps in a method of making an article, according to an aspect of the present disclosure.

The article 10 disclosed herein can be formed using at least two different methods. In an aspect, there is disclosed a method of making an article 10, such as a diffractive pigment, including coating a first organic layer 12 onto a substrate 26, as shown in FIG. 4A. The first organic layer 12 can be coated using a liquid coating process. The liquid coating process allows the first organic layer 12 to self-level thereby providing planar exterior surfaces. A reflector layer 20 can be deposited onto the first organic layer 12 using any deposition technique, including vacuum deposition processes, and liquid coating processes.

The method can further include heating the reflector layer 20 deposited on the first organic layer 12 prior to embossing. The deposited layers can be heated to a temperature higher than a softening temperature of the first organic layer 12.

Figure 4B:
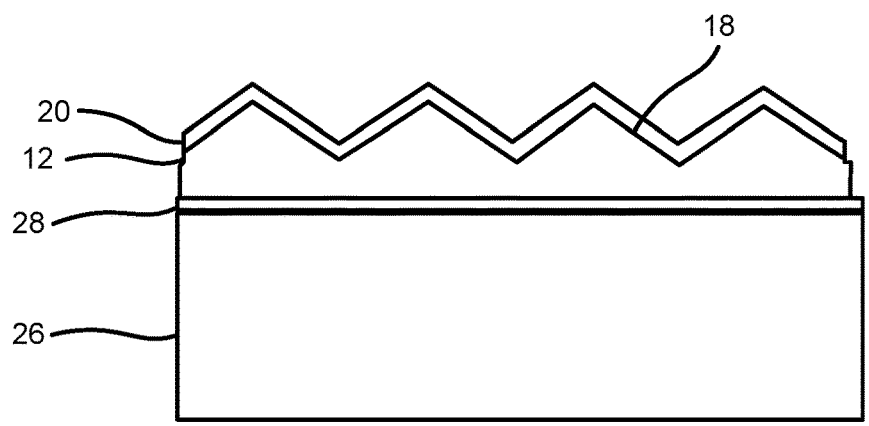

As shown in FIG. 4B, both of the reflector layer 20 and the first organic layer 12 can be embossed. Embossing can occur through at least one of temperature and pressure contact with an embossing master. A discontinuous embossing system can be used wherein the substrate/coated layers, for example, as shown in FIG. 4A, can be moved by discrete steps under an embossing plate. Alternatively, the embossing master can be an embossing roller that is heated to a temperature below the thermoplastic softening temperature of the first organic layer 12.

Figure 4C:
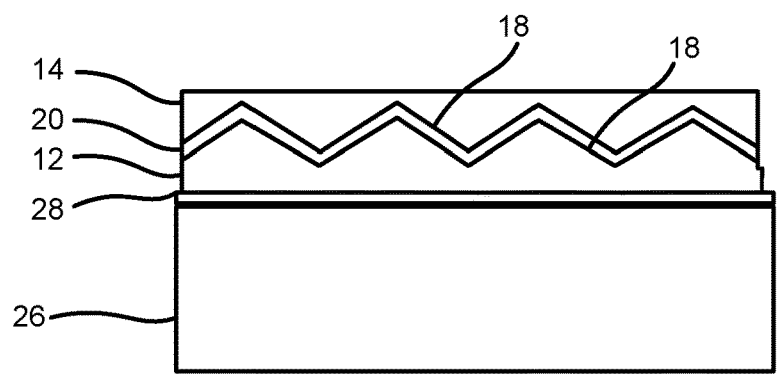

As shown in FIG. 4C, the method can further include coating a second organic layer 14 onto the embossed reflector layer 20. The second organic layer 14 can be coated using a liquid coating process. The liquid coating process allows the second organic layer 14 to self-level thereby providing a planar exterior surface and an interior embossed surface.

The layers of the article 10 can be present in a solvent or water base solution. In this manner, the layers can be coated/applied/deposited using a liquid coating process. Non-limiting example of a liquid coating process include slot-die, gravure, microgravure, inkjet, curtain coating, metering rod, myer bar coating, flexo, offset printing, slot-bead, slide bead, slot curtain, slide curtain, tensioned web and reverse roll, and other liquid coating and printing processes that apply a liquid on to a substrate or previously deposited layer to form a liquid layer or film that is subsequently dried and/or cured. The liquid coating process can allow for the transfer of the composition of the layer, such as the organic layer 12, 14, at a faster rate as compared to other deposition techniques, such as vapor deposition. Additionally, the liquid coating process can allow for a wider variety of materials to be used in the layer with a simple equipment set up. It is believed that the layer formed using the disclosed liquid coating process can exhibit improved optical performance.

Figure 4D:
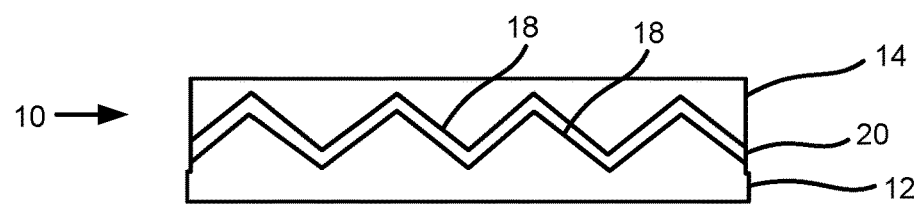

The method can further include releasing the substrate 26 thereby forming an article 10, as shown in FIG. 4D. In an aspect, the substrate 26 can include a release layer 28. The release layer 28 can have a lower adhesion to the first organic layer 12 as compared to the substrate 26. In an aspect, the release layer 28 is water soluble and can be eliminated.

The substrate 26 can be released from the deposited layers to create the article 10. In an aspect, the substrate 26 can be cooled to embrittle an associated release layer 28, if present. In another aspect, the release layer 28 could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be sized into article 10, such as an optical device in the form of a flake, foil, or sheet, using known techniques.

The method can further include applying a chilling drum to the embossed layers (reflector/first organic layer 12) to remove the heat provided by the embossing roller/plate. Embossing can provide a diffractive pattern, hologram, symbols, logos, or any other suitable microstructure to the deposited layers.

The substrate 26 can include a material that is heat resistant, such as a polyester, a polyamide, polyvinyl chloride, or propylene. The substrate 26 can be present in a roll configuration so that the layers of the article 10 are deposited onto the substrate 26 as it moves from an unwind to a rewind roll configuration. The substrate 26 can include a material that has a softening temperature that is higher than a softening temperature of the multiple layers, such as the organic layer 12, 14. The substrate 26 can be made of a flexible material. The substrate 26 can be any suitable material that can receive multiple layers deposited during the manufacturing process. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 μm to about 100 μm, and as a further example from about 10 μm to about 50 μm.

Figure 5A:
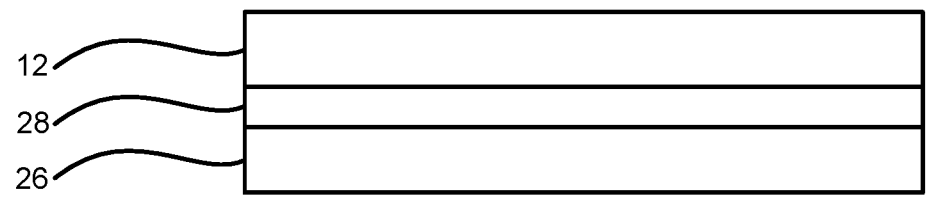
FIGS. 5A-5E illustrate various steps in a method of making an article, according to another aspect of the present disclosure.
Figure 5B:
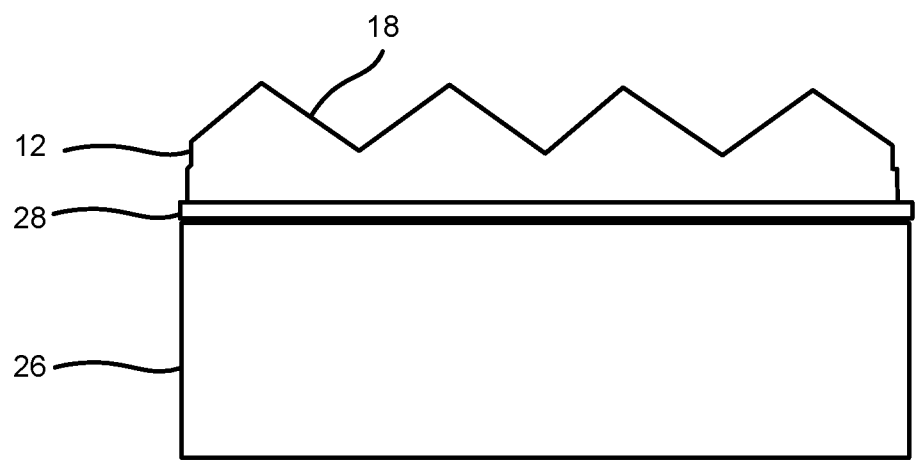
Figure 5C:
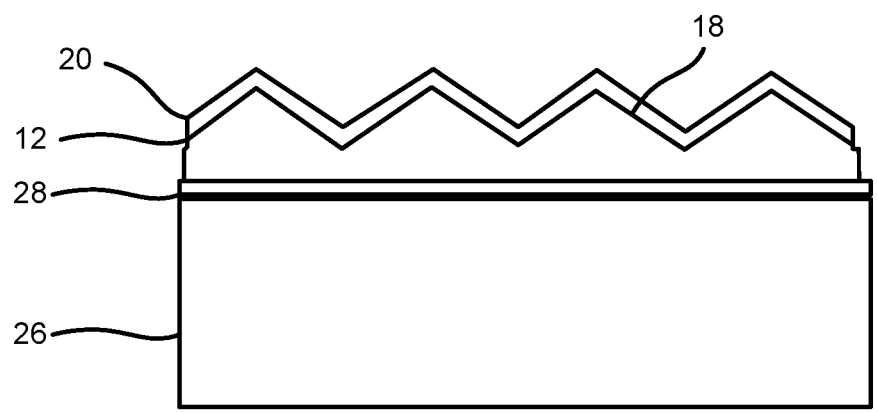

In an aspect, there is also disclosed a method of making an article 10, as shown in FIGS. 5A-5E. The method can include coating a first organic layer 12 onto a substrate 26, optionally including a release layer 28. The first organic layer 12 can be coated using a liquid coating process. As shown in FIG. 5B, the method can include embossing the coated first organic layer 12 to produce an interior embossed surface 18. The method can include depositing a reflector layer 20 onto the interior embossed first organic layer 12. In this manner, the reflector layer 20 conforms to the interior embossed surface 18 of the embossed first organic layer 12, as shown in FIG. 5C.

Figure 5D:
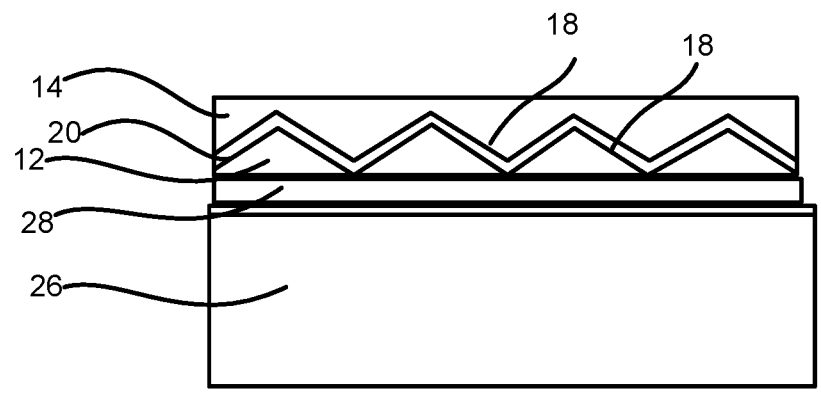

The method can further include coating a second organic layer 14 onto the deposited reflector layer 20, as shown in FIG. 5D. The second organic layer 14 can be coated using a liquid coating process.

Figure 5E:
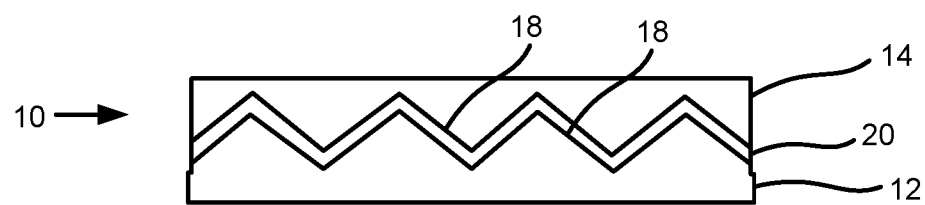

As shown in FIG. 5E, the substrate 26, and the optional release layer can be removed from the article 10.

In an aspect, the methods can include embossing a first organic layer 12 followed by deposition of the reflector layer 20 and deposition of the second organic layer 14. This method can result in the article 10 illustrated in FIG. 6. Alternatively, the method can include depositing the first organic layer 12, depositing the reflector layer 20, embossing both the first organic layer 12 and the reflector layer 20, and depositing the second organic layer 14. The article 10 has differing modulation on opposite exterior surfaces of the article. In this manner, the article 10 is asymmetric because the degree of modulation on opposite exterior surfaces is different. Statistically, 50% of the articles 10, such as flakes, having the less modulated second organic layer 14 will lie facing up, and 50% of the articles 10 having the more modulated first organic layer 12 will lie facing up, providing different diffractive effects. FIG. 8 could also be considered asymmetric because the degree of modulation on opposite exterior surfaces is different. FIG. 7 could be considered symmetric.

Additionally, or alternatively, the article 10, in the form of a flake, sheet, or foil, can also include a hard coat or protective layer. In some examples, these layers (hard coat or protective layer) do not require optical qualities.

Depending on the thermoplastic properties of the article 10 and the release layer 28, an embossing layer can be included between the substrate 26 and the release layer 28. This embossing layer can be part of the article 10. In an aspect, the release layer 28 can be eliminated or introduced between the substrate 26 and the embossable layer.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A method of making an article, comprising:
    coating a first organic layer onto a substrate, wherein the first organic layer includes an organic material and a colorant;
    depositing a reflector layer onto the first organic layer;
    embossing both of the reflector layer and the first organic layer, and
    coating a second organic layer onto the embossed reflector layer using a liquid coating process, wherein the liquid coating process is chosen from slot-die, inkjet, curtain coating, metering rod, myer bar coating, flexo, offset printing, slot-bead, slide bead, slot curtain and slide curtain, wherein the liquid coating process comprises coating a coating composition in liquid form and wherein the liquid coating process does not include vaporization of the liquid coating composition;
    wherein the article is a diffractive pigment.

2. The method of claim 1, wherein the second organic layer includes a colorant, and the first organic layer and the second organic layer are a same color.

3. The method of claim 1, wherein the first organic layer and the second organic layer are different colors.

4. The method of claim 1, wherein the first organic layer and the second organic layer include a same organic material.

5. The method of claim 1, wherein the first organic layer and the second organic layer include a different organic material.

6. The method of claim 1, further comprising a second absorber layer adjacent to the second organic layer.

7. The method of claim 1, wherein the liquid coating process is self-leveling.

8. The method of claim 1, wherein depositing the reflector layer uses a vacuum deposition process.

9. The method of claim 1, wherein an exterior surface of the second organic layer is substantially planar.

10. The method of claim 1, wherein the substrate includes a release layer.

11. The method of claim 10, wherein the release layer is a polyvinyl alcohol.

12. The method of claim 10, further comprising releasing the substrate.

13. The method of claim 12, wherein the reflector layer is on a first side of the first organic layer, the article further comprising a first absorber layer adjacent to a second side of the first organic layer, the second side of the first organic layer being opposite the first side of the first organic layer.

14. The method of claim 1, wherein the substrate further includes an embossable layer.

15. The method of claim 1, further comprising releasing the substrate from the article.

16. The method of claim 15, wherein the reflector layer is adjacent to a first surface of the first organic layer and a first surface of the second organic layer, the article further comprising a first absorber layer and a second absorber layer, the first absorber layer being adjacent to a second surface of the first organic layer that is opposite the first surface of the first organic layer and the second absorber layer being adjacent to a second surface of the second organic layer that is opposite the first surface of the second organic layer.

\* \* \* \* \*